US012153290B2

(12) United States Patent
Doppalapudi et al.

(10) Patent No.: US 12,153,290 B2
(45) Date of Patent: *Nov. 26, 2024

(54) OPTICAL MODULATION SKEW ADJUSTMENT SYSTEMS AND METHODS

(71) Applicant: MACOM Technology Solutions Holdings, Inc., Lowell, MA (US)

(72) Inventors: Naga Rajesh Doppalapudi, Santa Clara, CA (US); Echere Iroaga, Mountain View, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,207

(22) Filed: Feb. 28, 2022

(65) Prior Publication Data
US 2022/0187630 A1    Jun. 16, 2022

Related U.S. Application Data

(63) Continuation of application No. 16/818,832, filed on Mar. 13, 2020, now Pat. No. 11,314,107, which is a (Continued)

(51) Int. Cl.
*H04B 10/07* (2013.01)
*G02F 1/01* (2006.01)
(Continued)

(52) U.S. Cl.
CPC .......... *G02F 1/0121* (2013.01); *G02F 1/011* (2013.01); *H04B 10/07* (2013.01); *G06F 1/10* (2013.01); *H04B 17/10* (2015.01)

(58) Field of Classification Search
CPC ... H04L 7/0037; H04L 27/2096; H04L 27/36; H04L 27/364; H03K 5/13; H03K 5/135;
(Continued)

(56) References Cited

U.S. PATENT DOCUMENTS 4,533,959 A *  8/1985  Sakurai ............... H04N 1/3878
                                                        358/452
5,105,293 A    4/1992  Bortolini
                       (Continued)

FOREIGN PATENT DOCUMENTS

| CN | 101083473    | 12/2007 |
|---|---|---|
| CN | 105075136    | 11/2015 |
| WO | 2009036390 A1 | 3/2009 |

OTHER PUBLICATIONS

Analui et al., "A Fully Integrated 20-GB/s Optoelectronic Transceiver Implemented in a Standard 0.13-μm CMOS SOI Technology", Nov. 20, 2006, pp. 2945-1955, IEEE Journal of Solid-State Circuits, vol. 41, Issue: 12, Dec. 2006. (Year: 2006).*

(Continued)

*Primary Examiner* — Sophia Vlahos

(57) ABSTRACT

The present invention facilitates optical modulation skew adjustment. Components of an on chip optical device driver system can cooperatively operate to provide modulated driver signals to drive configuration of optical signals. A serializer is configured to receive parallel data signals and forward corresponding serial data signals. A multiplexing component is configured to selectively output an in-phase component and a quadrature component of the serial data signals, including implementing skew adjustments to aspects of a first output signal and a second output signal. An output stage is configured to output signals that modulate an optical signal, including the first output signal and the second output signal. An on chip skew detector is configured to detect a skew difference between the first output signal and the second output signal. A skew calibration component is configured to direct skew adjustment between the first output signal and the second output signal.

36 Claims, 10 Drawing Sheets

Related U.S. Application Data continuation-in-part of application No. 16/143,493, filed on Sep. 27, 2018, now Pat. No. 10,784,845.

(51) Int. Cl.
*G06F 1/10* (2006.01)
*H04B 17/10* (2015.01)

(58) Field of Classification Search
CPC .......... H03K 5/14; H04B 10/07; H04B 10/50; H04B 10/0775; H04B 17/10; G02F 1/011; G06F 1/10
See application file for complete search history.

(56) References Cited

U.S. PATENT DOCUMENTS

| | | | |
|---|---|---|---|
| 5,272,728 A | 12/1993 | Ogawa | |
| 6,208,181 B1* | 3/2001 | Johnson | H03L 7/081 331/25 |
| 7,965,946 B2 | 6/2011 | Conroy et al. | |
| 8,422,478 B2 | 4/2013 | Okamoto | |
| 8,432,936 B2 | 4/2013 | Ling | |
| 8,461,858 B1 | 6/2013 | Singh | |
| 8,726,131 B2 | 5/2014 | Jongren et al. | |
| 8,848,747 B2 | 9/2014 | Zeng et al. | |
| 8,976,838 B2 | 3/2015 | Jaeckel et al. | |
| 9,184,834 B1 | 11/2015 | Zhang et al. | |
| 9,212,912 B1 | 12/2015 | Salit et al. | |
| 9,237,001 B1 | 1/2016 | Song et al. | |
| 9,548,858 B1 | 1/2017 | Cirit et al. | |
| 9,634,743 B2 | 4/2017 | Sun | |
| 9,705,592 B1 | 7/2017 | Schmogrow et al. | |
| 10,313,099 B1 | 6/2019 | Li et al. | |
| 10,712,770 B1 | 7/2020 | Chiang et al. | |
| 10,784,845 B2 | 9/2020 | Doppalapudi et al. | |
| 11,314,107 B2* | 4/2022 | Doppalapudi | H04B 10/505 |
| 2001/0036005 A1 | 11/2001 | Hatayama et al. | |
| 2002/0007475 A1 | 1/2002 | Crozier | |
| 2004/0161068 A1 | 8/2004 | Zerbe et al. | |
| 2005/0129408 A1 | 6/2005 | Kim et al. | |
| 2006/0008030 A1* | 1/2006 | Luke | H04L 27/364 375/298 |
| 2006/0072922 A1 | 4/2006 | MacDonald et al. | |
| 2007/0217738 A1 | 9/2007 | Anderegg et al. | |
| 2008/0012633 A1 | 1/2008 | Kim | |
| 2008/0036509 A1 | 2/2008 | Jang | |
| 2008/0149457 A1 | 6/2008 | Matheisl et al. | |
| 2008/0175586 A1 | 7/2008 | Perkins et al. | |
| 2009/0074407 A1 | 3/2009 | Hornbuckle et al. | |
| 2009/0003755 A1 | 6/2009 | Liu et al. | |
| 2009/0317090 A1 | 12/2009 | Conroy et al. | |
| 2010/0080570 A1 | 4/2010 | Conroy et al. | |
| 2010/0120390 A1* | 5/2010 | Panikkath | H03B 19/12 455/208 |
| 2010/0129088 A1* | 5/2010 | Akasaka | H04B 10/50577 398/188 |
| 2011/0044702 A1 | 2/2011 | Mizuguchi et al. | |
| 2012/0007647 A1 | 1/2012 | Shim et al. | |
| 2012/0250793 A1 | 10/2012 | Khatana et al. | |
| 2012/0256670 A1 | 10/2012 | Ding et al. | |
| 2013/0229211 A1 | 9/2013 | Nishiyama et al. | |
| 2013/0346721 A1 | 12/2013 | Giovannini et al. | |
| 2014/0253195 A1 | 9/2014 | Chandrasekaran et al. | |
| 2015/0222254 A1 | 8/2015 | Walker | |
| 2016/0006538 A1 | 1/2016 | Yoshida et al. | |
| 2016/0180898 A1 | 6/2016 | Hwang et al. | |
| 2017/0033774 A1 | 2/2017 | Hedayati et al. | |
| 2017/0149457 A1 | 5/2017 | Mayer et al. | |
| 2017/0264304 A1 | 9/2017 | Dedic et al. | |
| 2018/0137902 A1 | 5/2018 | Giovannini et al. | |
| 2018/0367220 A1 | 12/2018 | Nomura et al. | |
| 2019/0089479 A1 | 3/2019 | Yamauchi et al. | |
| 2019/0149388 A1 | 3/2019 | Torbatian | |
| 2019/0123728 A1 | 4/2019 | Zhao et al. | |
| 2019/0131945 A1* | 5/2019 | Lakshmikumar | G05F 1/46 |
| 2019/0215146 A1 | 7/2019 | Ke et al. | |
| 2019/0272804 A1 | 9/2019 | Amirkhany et al. | |
| 2019/0326998 A1 | 10/2019 | Chen et al. | |
| 2021/0006238 A1 | 1/2021 | Doppalapudi et al. | |
| 2021/0306132 A1 | 9/2021 | Doppalapudi et al. | |

OTHER PUBLICATIONS

Wu, et al. "A 20 GB/s NRZ/PAM-4 1V transmitter in 40 nm CMOS driving a Si-photonic modulator in 0.13um CMOS". SSCC 2013.
S. Moazeni "A 40-GB/s PAN-4 Transmitter Based on a Ring Resonator Optical DAC in 45-nm SOI CMOS", JSSC, Dec. 2017.
Frans, et al. A 40-to-64 Gbs NRZ Transmitter With Supply-Regulated Front-End in 16 nm FinFET, IEEE Journal of Solid-State Circuits, vol. 51, No. 12, Dec. 2018.

* cited by examiner

700

710
Detecting a skew difference between a first output signal and a second output signal on a chip, wherein the first output signal and second output signal are modulation signals configured to modulate respective optical signals; and 720
Performing a skew detection process including adjusting the skew automatically on chip based upon results of the detecting.

FIG 7

OPTICAL MODULATION SKEW ADJUSTMENT SYSTEMS AND METHODS

RELATED APPLICATIONS

The present invention is a continuation of and claims the benefit of USPTO application Ser. No. 16/818,832 entitled "Optical Modulation Skew Adjustment Systems and Methods" filed on Mar. 13, 2020, which is a continuation in part of co-pending USPTO application Ser. No. 16/143,493 entitled "Error Detection and Compensation for a Multiplexing Transmitter" filed on Sep. 27, 2018, all of which are incorporated by reference.

FIELD OF THE INVENTION

The present invention relates to the field of skew calibration for optical signal transmission.

BACKGROUND OF THE INVENTION

Numerous electronic technologies such as digital computers, calculators, audio devices, video equipment, and telephone systems facilitate increased productivity and cost reduction in analyzing and communicating data and information in most areas of business, science, education, and entertainment. There can be various types of communications including optical communications (e.g., light emitting diodes (LEDs), laser, fiber, visible, non-visible, etc.). Accurately communicating the information is typically very important and signal fidelity is often critical. Achieving proper relationships (e.g., synchronous, particular predetermined delay, etc.) between electrode signals in multi-electrode optical modular can be particularly problematic.

Signal timing with respect to other signals can be critical. Synchronous transmission of different signals can be important and inappropriate signal skew often has a significant impact on signal fidelity. Traditional approaches to skew detection and calibration typically involve manual intervention and relatively expensive and complex circuitry. Conventional skew and calibration techniques also often involve manual input and off chip components. The reliance on manual input can introduce errors and increase costs. The use of off chip components can introduce problematic delays that interfere or distort the measurement and adjustment values of on chip signal skew delays and mismatches. Properly dealing with delay mismatches at sub-picosecond levels can be essential for segmented multi-electrode optical modulator based transmitters. As the speeds start to increase and get higher, an unintended misalignment or mismatch of signals from the electrodes becomes an increasingly important factor and critical to the performance of the system. It is traditionally difficult and expensive to accurately and efficiently measure and compensate for delay mismatches between transmitters at sub-picosecond levels.

SUMMARY

The present invention facilitates optical modulation skew adjustment. In one embodiment, an on chip optical device driver system includes an on chip serializer, an on chip multiplexing component, an output stage, on chip skew detector, and an on chip skew calibration component. The serializer is communicatively coupled to the multiplexing component which is communicatively coupled to output stage. The skew calibration component is communicatively coupled to the multiplexing component. The components of the driver system can cooperatively operate to provide modulated driver signals to drive configuration of optical signals. The serializer is configured to receive parallel data signals and forward corresponding serial data signals. The multiplexing component is configured to selectively output an in-phase component and a quadrature component of the serial data signals, including implementing skew adjustments to aspects of a first output signal and a second output signal. The output stage is configured to output signals that modulate an optical signal, including the first output signal and the second output signal. The on chip skew detector is configured to detect a skew difference between the first output signal and the second output signal. In one exemplary implementation, the skew calibration component is configured to direct skew adjustment between the first output signal and the second output signal.

In one embodiment, the driver system further comprises a first switch and a second switch. The first switch is configured to selectively couple the on chip skew calibration component to the skew detector and the output stage. The second switch is configured to selectively couple the on chip skew calibration component to an in-phase interpolator aspect and a quadrature interpolator aspect of the skew adjustment component.

In one exemplary implementation, the skew calibration component comprises an analog comparator and a digital to analog converter. The digital to analog converter can be configured to tune to calibration loop mismatches such as the analog comparator inherent offset voltage etc.

In one embodiment, the multiplexing component comprises a multiplexer, a first phase interpolator component, a second phase interpolator component, and a clock divider. The multiplexer is communicatively coupled to the first phase interpolator component and the second phase interpolator component. The multiplexer is configured to selectively output an in-phase component and a quadrature component of the serial data signals. The first phase interpolator component is configured to forward an in-phase selection signal to the multiplexer. The second phase interpolator component is configured to forward quadrature selection signal to the multiplexer.

In one embodiment, the skew is adjusted so there is zero skew difference between the first output signal and the second output signal. In one exemplary implementation, the skew is adjusted so there is fixed skew difference between the first output signal and the second output signal. The first output signal can be associated with a first modulation lane and the second output signal is associated with a second modulation lane. In one embodiment, the first output signal and the second output signal can be 180 degrees out of phase during calibration. The first output signal can be considered a positive signal of the first modulation lane and the second output signal can be considered a negative signal of the second modulation lane.

In one embodiment, an exemplary on chip optical device driver method includes detecting a skew difference between a first output signal and a second output signal on a chip, and adjusting the skew on chip based upon results of the detecting. The first output signal and the second output signal are modulation signals configured to modulate respective optical signals. In one embodiment, the first output signal is associated with a first modulation lane and the second output signal is associated with a second modulation lane. The first output signal can be considered a positive signal of the first modulation lane and the second output signal can be considered a negative signal of the second modulation lane. In one embodiment, detecting the skew difference includes applying a signal pattern from a plurality of transmitters, and enabling a skew detector.

In one embodiment, adjusting the skew includes enabling a calibration mode, and performing an offset adjustment process on the first output signal with respect to the second output signal. The offset adjustment process can include applying an offset current adjustment on chip to at least one of the first output signal and the second output signal, and comparing the results of the offset current application, wherein the applying an offset current adjustment and comparing the results are performed iteratively/progressively until a resulting particular skew value is achieved. The offset adjustment process can include an auto zero calibration process in which the resulting particular skew value is zero and indicates there is no skew between the first output signal and the second output signal. The offset adjustment process can include adjusting, on chip, a delay between the first output signal and a second output signal.

An on chip optical device driver method can also include selectively switching between a calibration mode and normal mode. In one embodiment, an on chip optical device driver method further comprises tuning a mismatch loop.

DESCRIPTION OF THE DRAWINGS

The accompanying drawings, which are incorporated in and form a part of this specification, are included for exemplary illustration of the principles of the present invention and are not intended to limit the present invention to the particular implementations illustrated therein. The drawings are not to scale unless otherwise specifically indicated.

FIG. 7 is a flow chart of an exemplary on chip optical device driver method 700 in accordance with one embodiment.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail so as not to unnecessarily obscure aspects of the current invention.

Efficient and effective optical modulation driver skew adjustment systems and methods are presented. Unlike typical traditional approaches, the presented optical modulation driver skew adjustment systems and methods can provide automated skew adjustment with minimal or no manual input. In one embodiment, the optical modulation driver skew adjustment systems and methods can also enable skew adjustment with little or no off-chip component participation. In one exemplary implementation, the skew can be adjusted so that signals are synchronous. In one exemplary implementation, a predetermined or intentional delay can be introduced.

Figure 1:
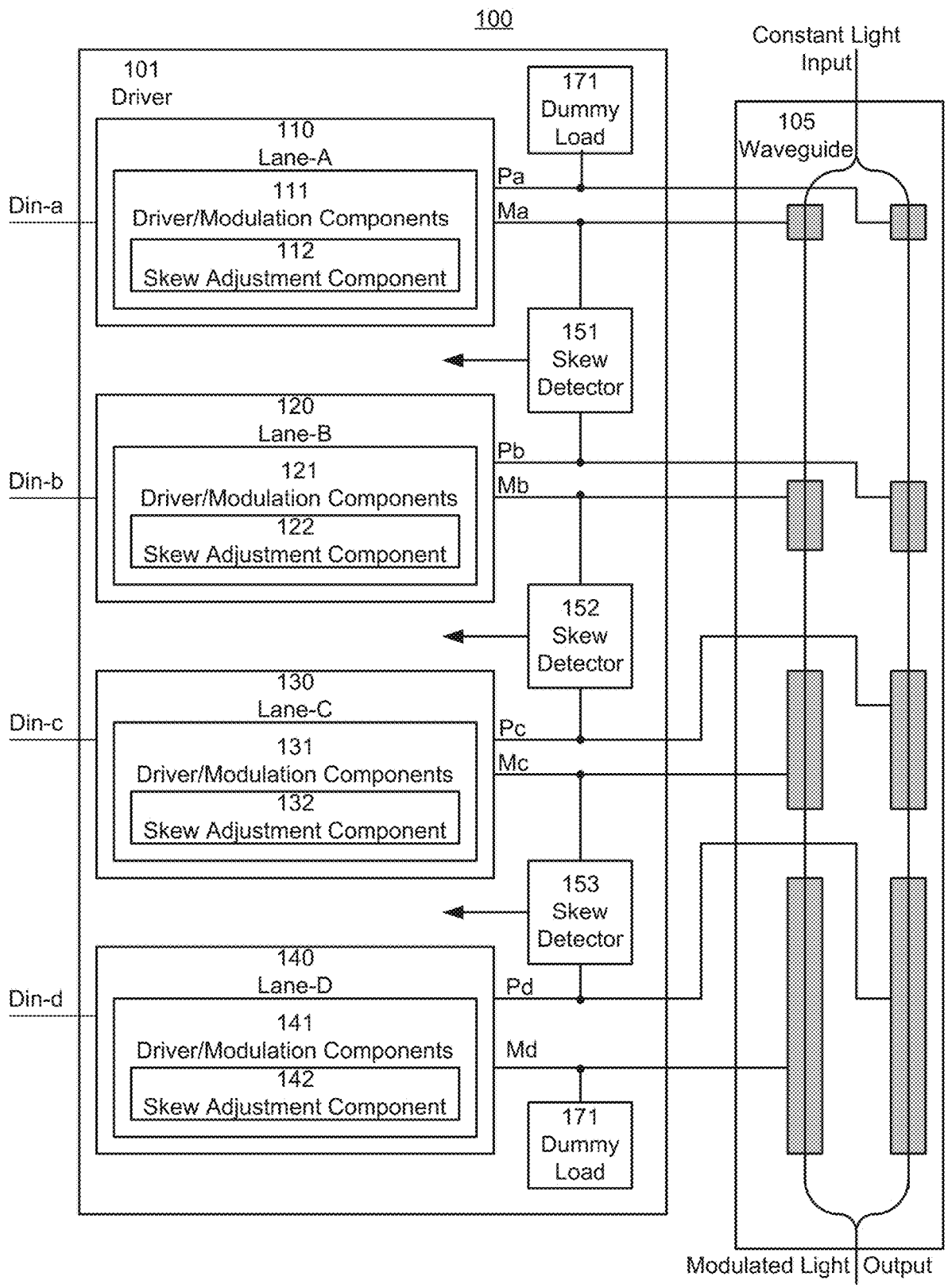
FIG. 1 is a block diagram an exemplary on chip optical system in accordance with one embodiment.

FIG. 1 is a block diagram an exemplary on chip optical system 100 in accordance with one embodiment. Optical system 100 includes driver 101 and waveguide 105. Driver 101 includes lanes 110 through 140 and skew detectors 151 through 153. Lanes 110 through 140 include respective driver/modulation components 111 through 141. Driver/modulation components 111 through 141 include respective skew adjustment components 112 through 142. Data input a through d (Din-a through Din-d) is fed into the respective diver/modulation components 111 through 141. The driver/modulation components 111 through 141 generate respective initial modulation driver signal sets Pa/Ma through Pd/Md which are forwarded to waveguide 105. One signal from a set and another signal from another set are forwarded to a skew detector which detects skew differences between the respective signals. The on chip optical system 100 can include dummy loads 171 and 172 coupled to the Pa and Md signals that are not coupled to a skew detector.

In one embodiment, the modulation driver signals in a respective lane are 180 degrees out of phase with one another. In one exemplary implementation, the P signal is considered a positive signal and the M signal is considered a negative signal. In one embodiment, Ma from lane 110 and Pb from lane 120 are fed into skew detector 151 which detects skew differences between the respective signals of lane 110 and lane 120; Mb from lane 120 and Pc from lane 130 are fed into skew detector 152 which detects skew differences between the respective signals of lane 120 and lane 130; and Mc from lane 130 and Pd from lane 140 are fed into skew detector 153 which detects skew differences between the respective signals of lane 130 and lane 140.

Skew adjustment components 112 through 142 automatically adjust the respective modulated driver signals in accordance with the detected skew. The skew adjusted modulated driver signals are fed into waveguide 105 and modulate the constant light input signal to produce a modulated light output signal. In one embodiment, skew adjusted electrical signals are utilized to drive light emitting devices which emit light the modulate intensity (e.g., constructively, destructively, etc.) of the light output of waveguide 105. In one exemplary implementation, the skew adjusted modulated driver light signals are fed to the waveguide phase shifters to modulate the light signal in the waveguide 105 (e.g., similar to Mach-Zehnder approaches, etc.). The modulated light output signal can be compatible with various communication standards (e.g., NRZ, PAM-4, PAM-16, PAN-N, etc.).

Figure 2:
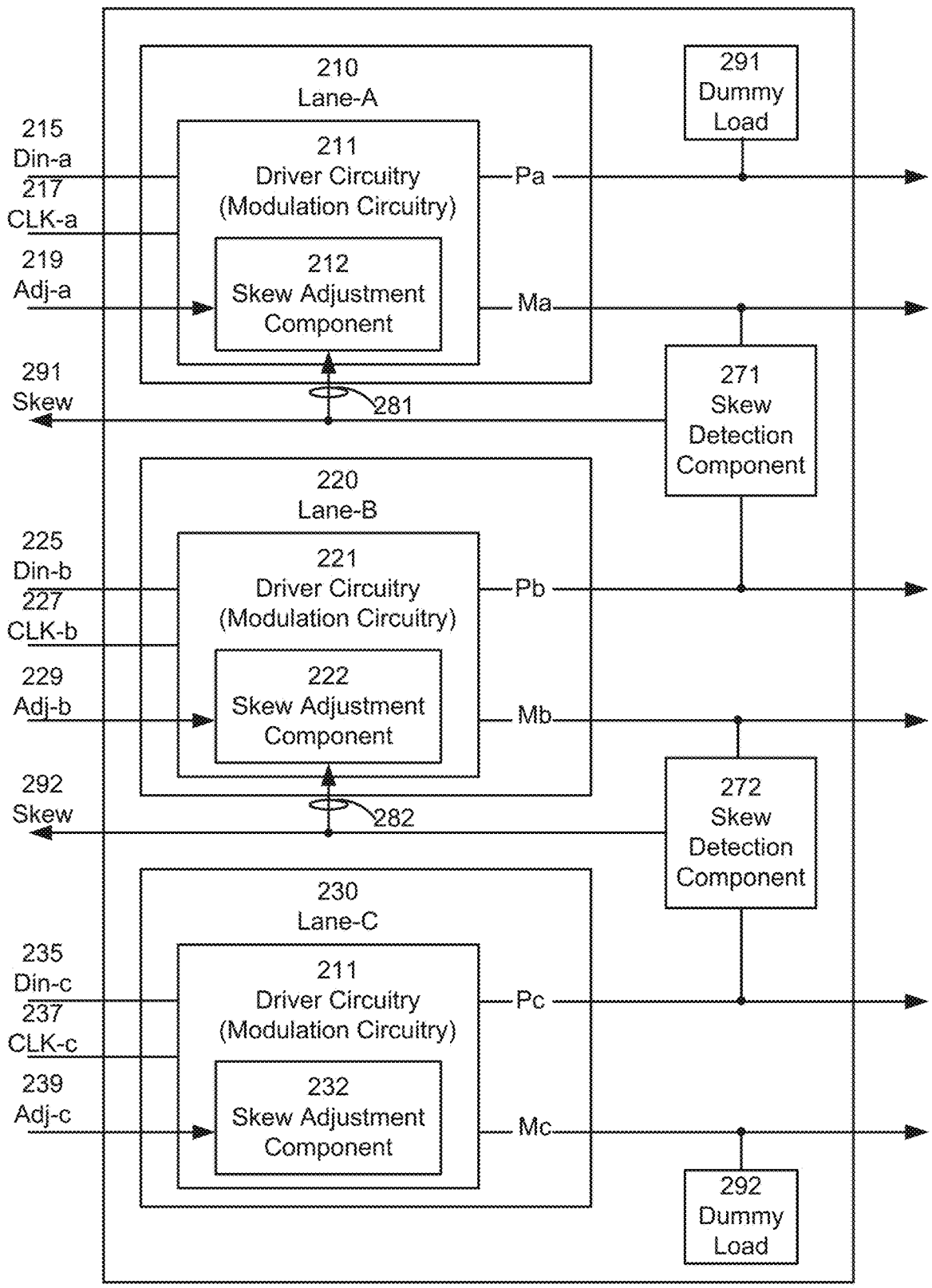
FIG. 2 is a block diagram of an exemplary on chip optical driver system in accordance with one embodiment.

The skew adjustment components can adjust the skew based upon directions from various sources. FIG. 2 is a block diagram of an exemplary on chip optical driver system 200 in accordance with one embodiment. Optical driver system 200 includes lanes 210 through 230 and skew detectors 271 through 272. The on chip optical system 200 can include dummy loads 291 and 292 coupled to the Pa and Mc signals that are not coupled to a skew detector. Lanes 210 through 230 include respective driver/modulation components 211 through 231. Driver/modulation components 211 through 231 include respective skew adjustment components 212 through 232. Data input a through c (Din-a through Din-d) is fed into the respective diver/modulation components 211 through 231. Skew detection components 271 through 272 can forward the skew detection information to skew adjustment components and off chip. The skew adjustment components 212 and 222 can adjust the skew based upon skew adjustment component signals 281 and 282 from the skew detection components 271 through 272 respectively. The skew adjustment components 212 and 222 can adjust the skew based upon directions from skew calibration components in various locations (e.g., included with skew detection components 271 and 272, included in driver circuitry 211 and 222, etc.). The skew adjustment components 212, 222, and 232 can also adjust the skew based upon adjustment instructions Adj-a through Adj-c from off chip.

Figure 3:
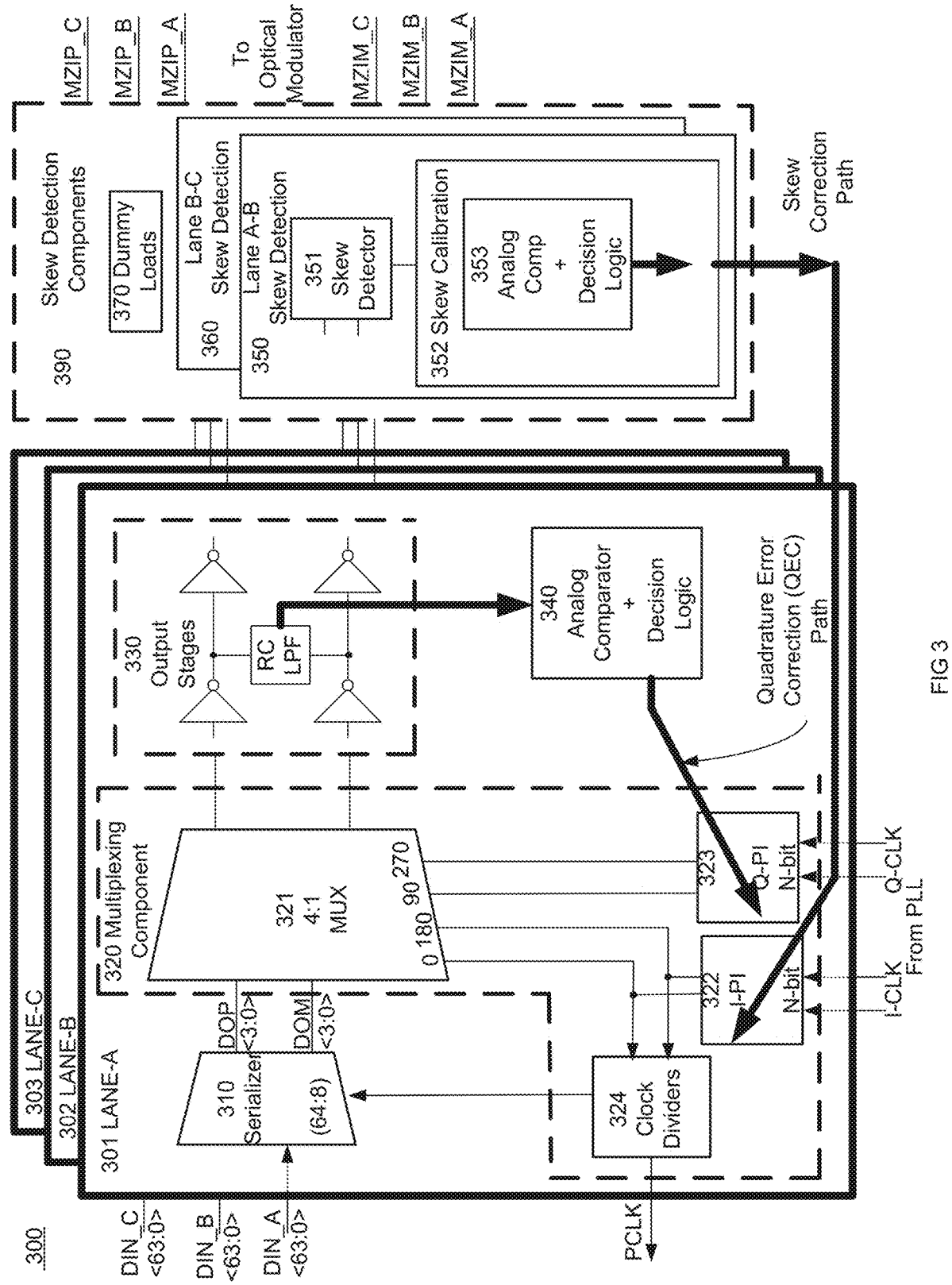
FIG. 3 is a block diagram an exemplary on chip optical device driver system in accordance with one embodiment.

FIG. 3 is a block diagram an exemplary on chip optical device driver system 300 in accordance with one embodiment. Driver system 300 includes skew detection components 390 and lanes 301, 302, and 303. Lane-A 301 includes on chip components such as serializer 310, multiplexing component 320, an output stage 330, and analog comparator decision logic 340. In one embodiment, multiplexing component 320 is a high speed 4:1 multiplexer. Serializer 310 is communicatively coupled to multiplexing component 320 which is communicatively coupled to output stage 330. Analog comparator decision logic 340 is communicatively coupled to multiplexing component 320 and output stage 330. In one embodiment, lane-B 302 and lane-C 303 have similar configurations to lane-A 301.

The components of driver system 300 cooperatively operate to provide modulated driver signals to drive an electro-optical modulator configuration to modulate optical signals. Serializer 310 is configured to receive parallel data signals and forward corresponding serial data signals. Multiplexing component 320 is configured to selectively output an in-phase component and a quadrature component of the serial data signals. Output stage 330 is configured to output signals that modulate an optical signal. Skew detection components 390 are configured to detect skew and the skew calibration component is configured for direct skew adjustment between a first output signal and a second output signal. In one exemplary implementation, analog comparator and decision logic 340 comprises an analog comparator, a digital to analog converter, and a digital finite state machine (FSM) logic. Analog comparator and decision logic 340 can be included in a Quadrature Error Correction (QEC) path and direct Q-PI 323 adjustments to MUX 321 selection controls. The QEC path is typically used to correct output errors caused due to a misalignment of the clocks from Q-PI 323 with respect to I-PI 322. The digital to analog converter can be configured to tune out mismatch errors in the analog comparator.

In one embodiment, multiplexing component 320 comprises multiplexer (MUX) 321, first phase interpolator component 322, second phase interpolator component 323, and clock dividers 324. Clock dividers 324 receive input from the first phase interpolator component 322. The second phase interpolator component 323 can be an N-bit Quadrature Phase Interpolator (Q-PI) component. The first phase interpolator component 322 can be an N-bit In-Phase Interpolator (I-PI) component. Multiplexer 321 is communicatively coupled to first phase interpolator component 322 and second phase interpolator component 323. MUX 321 is configured to selectively output an in-phase component and a quadrature component of the serial data signals based on selection control signals from first phase interpolator component 322 and second phase interpolator component 323. MUX 321, I-PI 322, and Q-PI 323 implements skew adjustments to aspects of a first output signal and a second output signal. Second phase interpolator component 323 is configured to forward quadrature selection signal to the MUX 321. First phase interpolator component 322 is configured to forward an in-phase selection signal to the MUX 321. In one exemplary implementation, first phase interpolator component 322 receives directions from skew calibration component 352 with regards to a skew related adjustments for the in-phase selection signal sent to the MUX 321. Further, the second phase interpolator component 322 receives directions from 340 in the QEC path for the quadrature selection signal sent to the MUX 321 after the skew related adjustments on the first phase interpolator 322.

In one embodiment, skew detection components 390 include lane skew detection components (e.g., 350, 360, etc.) and dummy loads 370. Lane skew detection component 350 detects skew between lanes A and B. Lane skew detection component 360 detects skew between lanes B and C. Dummy loads 370 are coupled to the Pa and Mc signals that are not coupled to a skew detector.

Lane skew detection component 350 includes skew detector 351 and skew calibration component 352. Skew detector 351 is configured to detect a skew difference between the first output signal of lane A (e.g., Ma, etc), and the second output signal of lane B (e.g., Pb, etc). Skew calibration component 352 is configured to direct adjustment of skew between the first output signal and the second output signal. In one exemplary implementation, skew calibration component 352 includes analog comparator and decision logic 353. A skew calibration path flows from skew detection components 390 to in phase interpolator (I-PI) 322. Skew calibration component 352 can be included in a skew correction path and direct I-PI 322 adjustments to MUX 321 selection controls. Lane skew detection component 360 can include a skew detector similar to skew detector 351 and a skew calibration component similar to skew calibration component 352.

In one embodiment, the skew is adjusted so there is zero skew difference between the first output signal and the second output signal. In one exemplary implementation, the skew is adjusted so there is fixed skew difference between the first output signal and the second output signal. The first output signal can be associated with a first modulation lane and the second output signal can be associated with a second modulation lane. In one embodiment, the first output signal and the second output signal can be differential signals (e.g., approximately 180 degrees out of phase, etc.). The first output signal can be considered a positive signal of the first modulation lane and the second output signal can be considered a negative signal of the second modulation lane.

Figure 4:
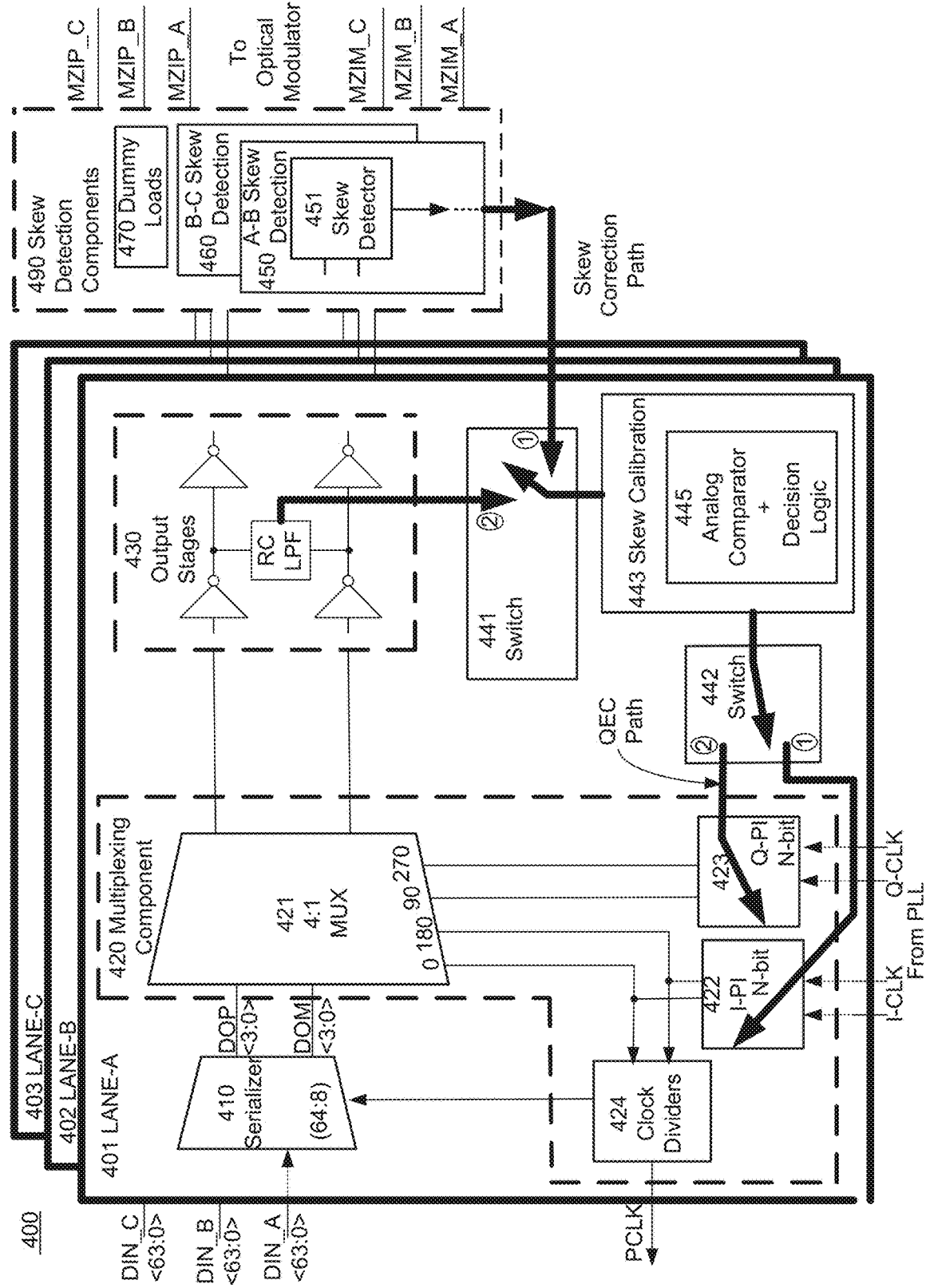
FIG. 4 is a block diagram of another an exemplary on chip optical device driver system in accordance with one embodiment.

FIG. 4 is a block diagram an exemplary on chip optical device driver system 400 in accordance with one embodiment. On chip optical device driver system 400 is similar to on chip optical device driver system 300, except on chip optical device driver system 400 skew calibration component 443 includes logic to selectively direct skew correction path adjustments and QEC path adjustments. In one exemplary implementation, skew calibration component 443 leverages hardware components in performing both types of path adjustments.

Driver system 400 includes skew detection components 490 and lanes 401, 402, and 403. Lane-A 401 includes on chip components such as serializer 410, multiplexing component 420, an output stage 430, and analog comparator decision logic 445. In one embodiment, multiplexing component 420 is a high speed 4:1 multiplexer. Serializer 410 is communicatively coupled to multiplexing component 420 which is communicatively coupled to output stage 430. Analog comparator decision logic 445 is communicatively coupled to multiplexing component 420 and is selectively coupled to output stage 430 and skew detection components 490. In one embodiment, lane-B 402 and lane-C 403 have similar configurations to lane-A 301.

The components of driver system 400 cooperatively operate to provide modulated driver signals to drive an electro-optical modulator configuration to modulate optical signals. Serializer 410 is configured to receive parallel data signals and forward corresponding serial data signals. Multiplexing component 420 is configured to selectively output an in-phase component and a quadrature component of the serial data signals. Output stage 430 is configured to output signals that modulate an optical signal. Skew detection components 490 are configured to detect skew between a first output signal and a second output signal.

In one embodiment, multiplexing component 420 comprises multiplexer (MUX) 421, first phase interpolator component 422, second phase interpolator component 423, and clock dividers 424. Clock dividers 424 receive input from the first phase interpolator component 422. The second phase interpolator component 423 can be an N-bit Quadrature Phase Interpolator (Q-PI) component. The first phase interpolator component 422 can be an N-bit In-Phase Interpolator (I-PI) component. Multiplexer 421 is communicatively coupled to first phase interpolator component 422 and second phase interpolator component 423. MUX 421 is configured to selectively output an in-phase component and a quadrature component of the serial data signals. Second phase interpolator component 423 is configured to forward a quadrature selection signal to the MUX 421. First phase interpolator component 422 is configured to forward an in-phase selection signal to the MUX 421. In one exemplary implementation, first phase interpolator component 422 and second phase interpolator component 423 selectively receive directions from skew calibration component 443 with regards to both the quadrature related adjustments of the quadrature selection signal and skew related adjustments for the in-phase selection signal sent to the MUX 421.

In one embodiment, skew detection components 490 include lane skew detection components (e.g., 450, 460, etc.) and dummy loads 470. Lane skew detection component 450 detects skew between lanes A and B. Lane skew detection component 460 detects skew between lanes B and C. Dummy loads 470 are coupled to the Pa and Mc signals that are not coupled to a skew detector.

Lane skew detection component 450 includes skew detector 451. Skew detector 451 is configured to detect a skew difference between the first output signal of lane A (e.g., Ma, etc), and the second output signal of lane B (e.g., Pb, etc). Lane skew detection component 460 includes a skew detector similar to skew detector 451.

Skew calibration component 443 is shared between a QEC path and a skew correction path. A QEC path and a skew calibration path are selectively formed by switch 411, skew calibration component 443, and switch 442. The skew calibration path flows from skew detection components 490 to first phase interpolator component 422. A QEC path flows from output stage 430 to second phase interpolator component 423. In one exemplary implementation, skew calibration component 443 includes analog comparator and decision logic 445. In one exemplary implementation, analog comparator and decision logic 445 comprises an analog comparator with an offset calibration feature and can be configured to tune out mismatches in the loop.

Figure 5:
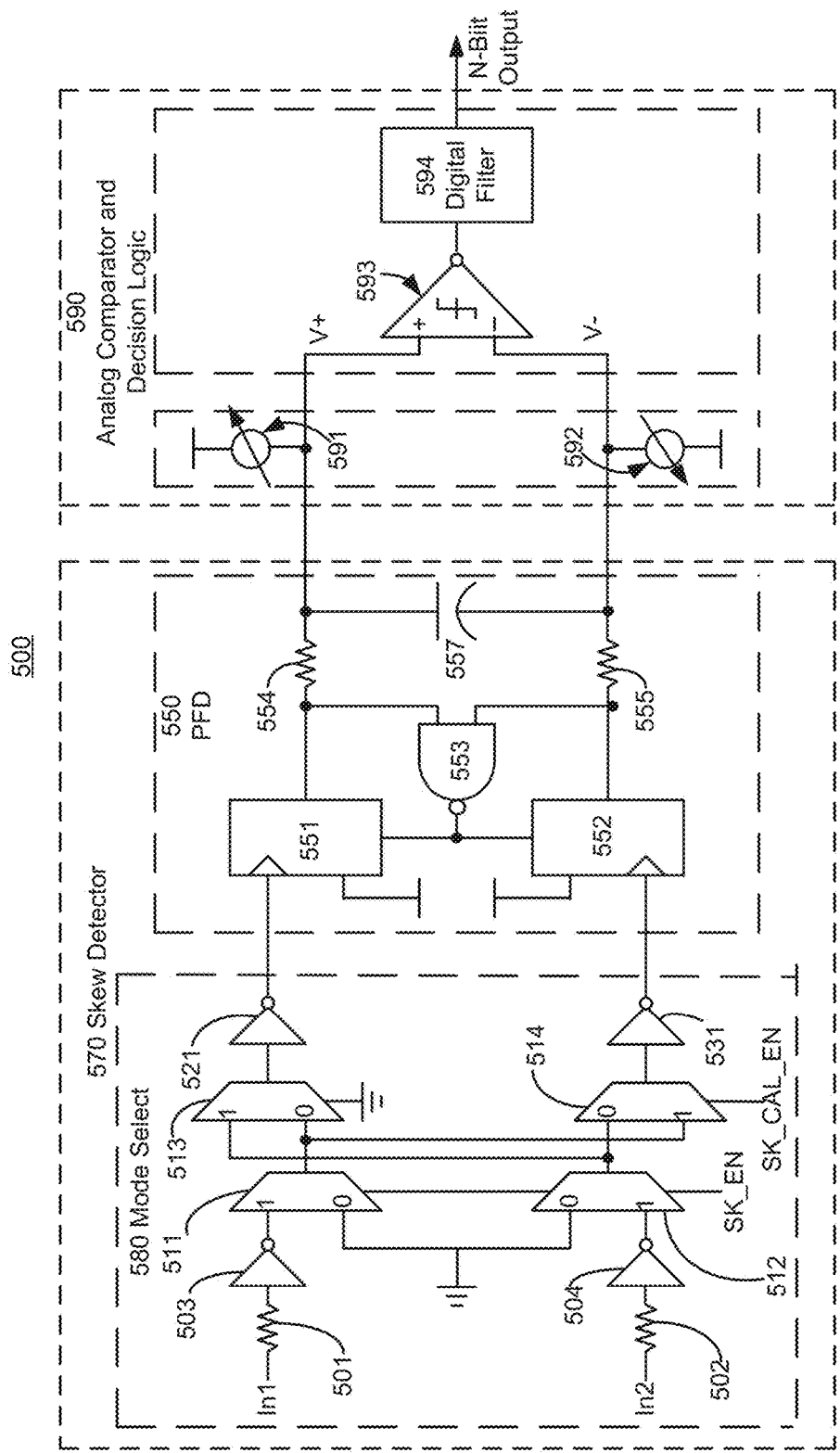
FIG. 5 is an exemplary block diagram of a skew adjustment system in accordance with one embodiment.

FIG. 5 is an exemplary block diagram of a skew adjustment system 500 in accordance with one embodiment. Skew adjustment system 500 includes skew detector 570 and analog comparator and decision logic 590. Analog comparator and decision logic 590 are included in a skew calibration component. In one embodiment, skew detector 570 is similar to skew detector 451 and analog comparator and decision logic 590 is similar to analog comparator and decision logic 445.

Skew detector 570 includes mode select component 580 and Phase Frequency Detector (PFD) 550. Mode select component 580 includes resistors 501 through 502 respectively coupled to buffers 503 and 504 which are respectively coupled to MUX 511 and 512, which are in turn respectively coupled to MUX 513 and 514. MUX 513 is coupled to a buffer chain represented by 521. MUX 514 is coupled to a buffer chain represented by 531. Buffers 521 and 531 are coupled to PFD 550. Resistors 501 and 502 can enable electrostatic discharge (ESD) protection. MUX 511 and 512 selection signals are utilized to enable and disable the skew detection period. MUX 513 and 514 selection signals are utilized to enabled and disabled calibration mode/detect mode and normal/off mode. The MUXs 513 and 514 can also be utilized to implement load balancing. The buffer chains ensure the same or similar signal is sent to the PFD 550. PFD 550 includes registers 551 and 552, logic AND gate 553, resistors 554 and 555, and capacitor 557.

Analog comparator and decision logic 590 includes variable current sources 591 and 592 coupled to analog comparator 593, which is coupled to digital filter 594. In one embodiment, variable current sources 591 and 592 supply digitally adjusted offset currents. In one exemplary implementation, analog comparator and decision logic 590 is shared between QEC path and skew correction path (e.g. similar to analog comparator and decision logic 445, etc.).

In one embodiment, currents are applied or injected. In one exemplary implementation, the currents are introduced by current sources (e.g., 591,592, etc.). The current injection can create a voltage shift. In one embodiment, a skew or offset is adjusted by varying the values of the applied or injected currents so that they are not equal.

If there is a systematic offset for phase detector due to mismatches, it can cause skew offset and should be calibrated out. In one embodiment, a skew detector is an offset compensated skew detector that compensates for phase detector offset. In one exemplary implementation, the skew detector/phase detector offset is removed. Unlike conventional skew detectors (e.g., in phase lock loop, etc.), an offset compensated skew detector reduces the risk of performance impacts associated with a phase detector mismatches. An offset compensated skew detector can also relax design requirements and save design costs. In one exemplary implementation, a comparator (e.g., 353, 445) is a flexible offset programmable comparator.

Figure 6:
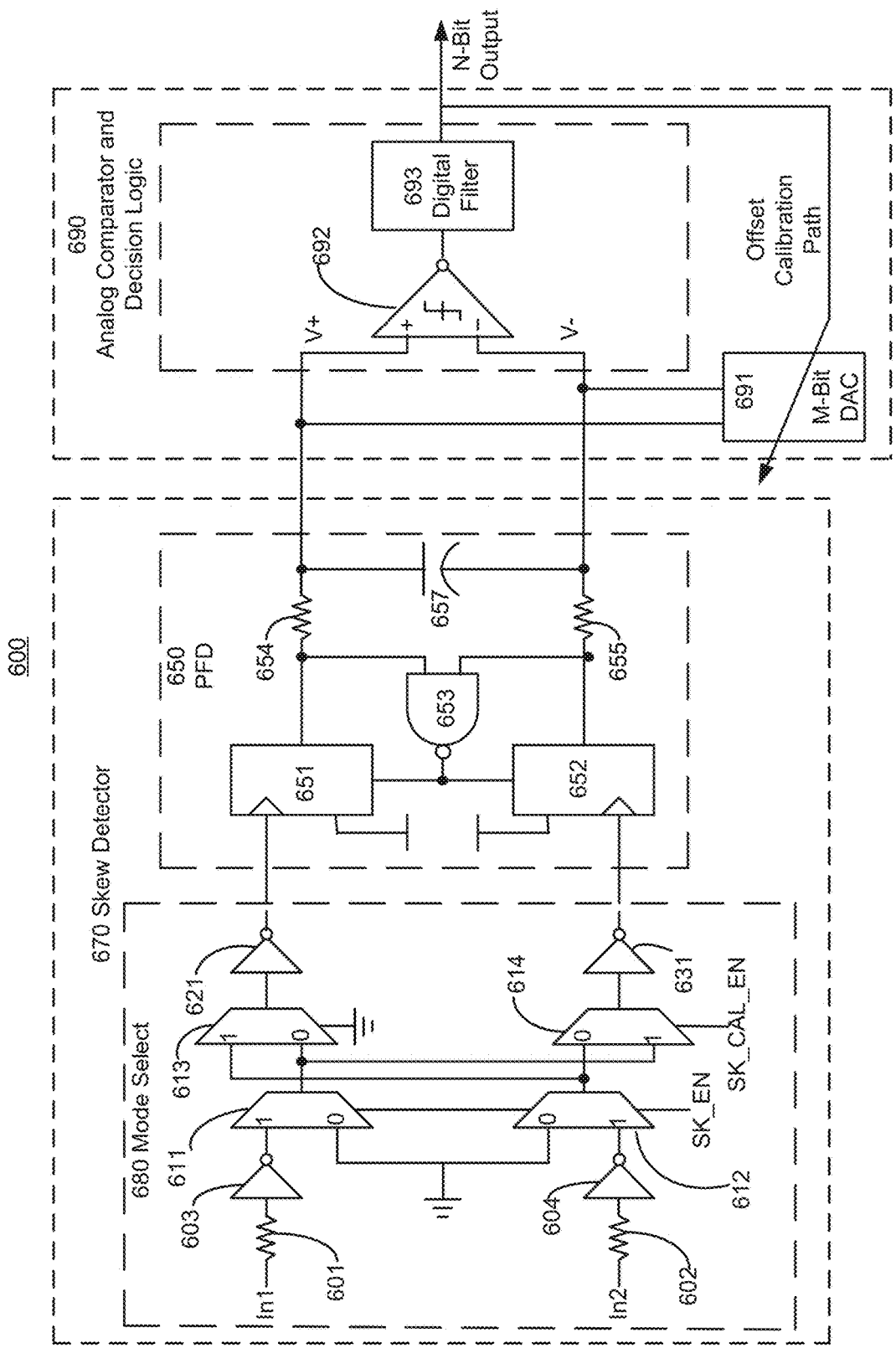
FIG. 6 is an exemplary block diagram of a skew adjustment system in accordance with one embodiment.

FIG. 6 is an exemplary block diagram of a skew adjustment system 600 in accordance with one embodiment. Skew adjustment system 600 includes skew detector 670 and analog comparator and decision logic 690. In one embodiment, skew detector 670 is similar to skew detector 451 and analog comparator and decision logic 690 is similar to analog comparator and decision logic 445.

Skew detector 670 includes mode select component 680 and Phase Frequency Detector (PFD) 650. Mode select component 680 includes resistors 601 through 602 respectively coupled to buffers 603 and 604 which are respectively coupled to MUX 611 and 612, which are in turn respectively coupled to MUX 613 and 614. MUX 613 is coupled to a buffer chain represented by 621. MUX 614 is coupled to a buffer chain represented by 631. Buffers 623 and 631 are coupled to PFD 650. Resistors 601 and 602 can enable electrostatic discharge (ESD) protection. MUX 611 and 612 selection signals are utilized to enabled and disabled the skew detection period. MUX 613 and 614 selection signals are utilized to enabled and disabled calibration mode/detect mode and normal/off mode. The MUXs 613 and 614 can also be utilized to implement load balancing. The buffer chains ensure the same or similar signal is sent to the PFD 550. PFD 650 includes registers 651 and 652, logic AND gate 653, resistors 654 and 655, and capacitor 657.

Analog comparator and decision logic 690 includes M-bit digital to analog converter (DAC) 691 coupled to analog comparator 692, which is coupled to digital filter 693. In one embodiment, M-bit DAC 691 supplies offset currents. In one exemplary implementation, analog comparator and decision logic 690 is shared between QEC path and skew correction path (e.g. similar to analog comparator and decision logic 445, etc.).

In one embodiment, skew adjustment system 600 utilizes a skew detector offset calibration approach and includes an offset calibration path. In one exemplary implementation, the MUX select signals SK_EN and SK_CAL_EN are set to logical one. The number of M bits is less than the number of N bits. The M-bits can be the upper bits of an N-bit output. The M-bit DAC is a current output digital to analog converter (DAC). In one exemplary implementation, the M-bit DAC is a current steering DAC implementation.

FIG. 7 is a flow chart of an exemplary on chip optical device driver method 700 in accordance with one embodiment. In one embodiment, on chip optical device driver method is directed by a digital control state machine. It is appreciated that on chip optical device driver method 700 can be initiated in various ways. The process can be started or initiated manually, in the factory, in the field, automatically in response to a trigger (e.g., sensing a temperature condition, detecting a performance condition, a communication link drops below a threshold, supply voltage change, etc.).

In step 710, a skew difference between a first output signal and a second output signal on a chip is detected, wherein the first output signal and second output signal are modulation signals configured to modulate respective optical signals. In one embodiment, the first output signal is associated with a first modulation lane and the second output signal is associated with a second modulation lane. The first output signal can be considered a positive signal of the first modulation lane and the second output signal can be considered a negative signal of the second modulation lane. In one embodiment, detecting the skew difference includes applying a signal pattern from a plurality of transmitters, and enabling a skew detector.

In step 720, a skew adjustment process is performed including adjusting the skew automatically on chip based upon results of the detecting. The skew is adjusted on chip based upon results of the detecting. In one embodiment, adjusting the skew includes enabling a calibration mode, and performing an offset adjustment process on the first output signal with respect to a second output signal. The offset adjustment process can include applying a predetermined offset current adjustment on chip to at least one of the first output signal and a second output signal. The offset adjustment process can include applying an offset current adjustment on chip to at least one of the first output signal and a second output signal, and comparing the results of the offset current application, wherein the applying an offset current adjustment and comparing the results are performed iteratively/progressively until a resulting particular skew value is achieved. The offset adjustment process can include an auto zero calibration process in which the resulting particular skew value is zero and indicates there is no skew between first output signal and a second. The offset adjustment process can include adjusting, on chip, a delay between the first output signal and a second output signal.

An on chip optical device driver method can also include selectively switching between a calibration mode and normal mode. In one embodiment, an on chip optical device driver method further comprises tuning a mismatch loop.

In one embodiment, the applied input signals are clock signals. In one exemplary implementation, a clock signal or clock pattern corresponds to alternating logical one and zero values. A positive signal and a negative signal from a lane can be the inverse of one another. The inverse relationship can ensure that the positive signal from a lane has the same phase as the negative signal from another lane. For example, in one embodiment, the phase detector is expecting the same or similar clock for the positive signal and negative signal from a lane.

Figure 8A:
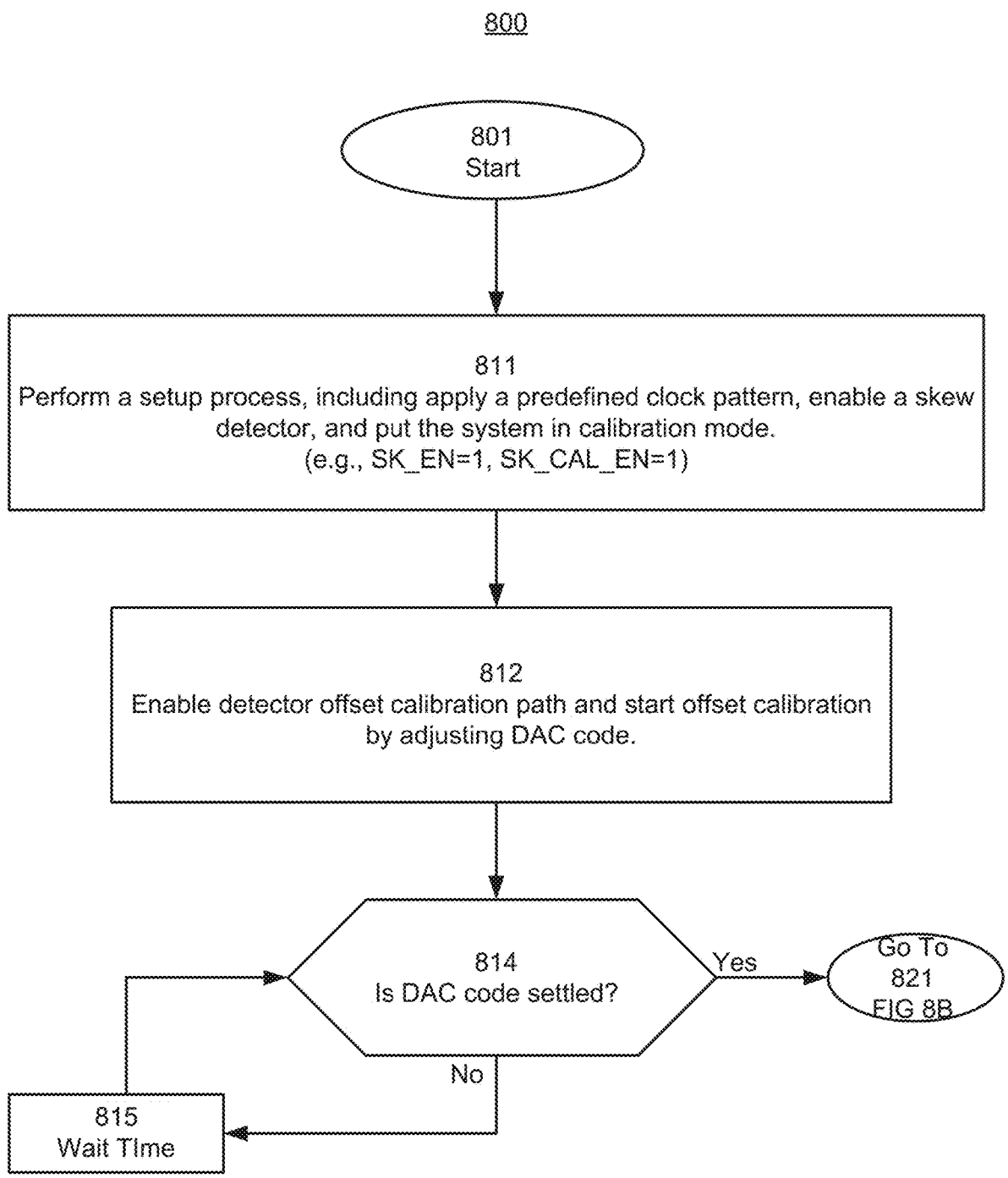
FIG. 8A is a flow chart of an exemplary on chip optical device driver method in accordance with one embodiment.
Figure 8B:
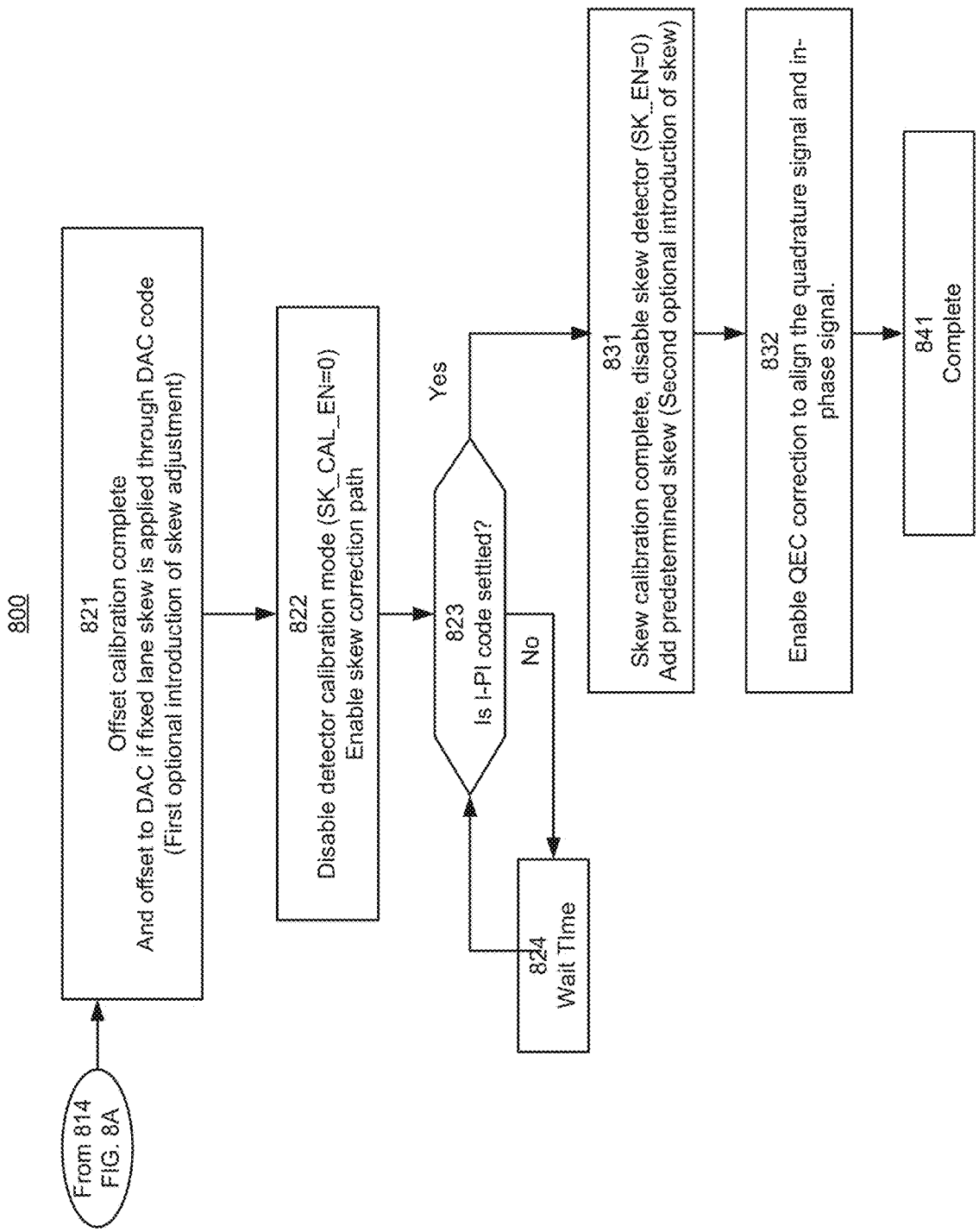
FIG. 8B is a continuation of the flow chart of an exemplary on chip optical device driver method in accordance with one embodiment.

FIGS. 8A and 8B illustrate a flow chart of an exemplary on chip optical device driver method 800 in accordance with one embodiment. In one embodiment, on chip optical device driver method 800 is similar to on chip optical device driver method 700.

In block 801, the process starts.

In block 811, a setup process is performed. The setup process includes, applying a predefined clock pattern, enabling the skew detector, and putting the system in calibration mode. In one exemplary implementation, signals SK_EN and SK_CAL_EN=1 are set to a logical one value.

In block 812, a detector offset calibration path is enabled and offset calibration is started by adjusting a digital to analog conversion (DAC) code.

In block 814, a determination is made if analysis and results for including a skew adjustment aspect in a DAC code are settled. In one embodiment, analysis/logic and results for including a skew adjustment aspect in a DAC code are implemented by a skew calibration component (e.g., similar to 352, 443, 590, etc.),If the DAC code is settled the process proceeds to block 821. If the DAC code is not settled the process proceeds to block 815.

In block 815, a wait time is implemented. After the wait time expires the process is complete returns to block 814.

In block 821, there is a first optional introduction of skew adjustment. The offset calibration is completed. In one embodiment, a DAC code is used to create an offset in the DAC, and the offset has the effect of implementing a fixed lane skew adjustment.

In block 822, the skew detector calibration mode is disabled and the skew correction path is enabled. In one exemplary implementation, the signal SK_CAL_EN is set to a logical zero.

In block 823, a determination is made if analysis and results for including a skew adjustment aspect in an I-PI code are settled. In one embodiment, analysis/logic and results for including a skew adjustment aspect in an I-PI code are implemented by a skew calibration component (e.g., similar to 352, 443, 590, etc.). If the I-PI code is settled the process proceeds to block 831. If the process is not settled the process proceeds to block 824.

In block 825, a wait time is implemented. After the wait time the process is complete returns to block 823.

In block 831, there is a second optional introduction of skew adjustment. The skew calibration/adjustment is completed. In one embodiment, the skew detector is disabled and a predetermined skew is added. In one exemplary implementation, disabling the skew detector includes setting a signal SK_EN to logical zero.

In block 832, QEC corrections are enabled. In one embodiment, the QEC corrections make adjustments to align a quadrature (Q) related signal and in-phase (I) related signal. In one exemplary implementation a quadrature error correction (QEC) path (e.g., similar to QEC path in FIG. 3, FIG. 4, etc) is used to correct output errors due to a misalignment of a Q-PI clock with respect to an I-PI clock.

In block 841 the process is complete.

In one exemplary implementation, a desired skew is a particular or predetermined amount of delay or phase shift between the modulated signals. In one exemplary implementation, a desired skew is a particular or predetermined amount of delay or phase shift between the electronic signals on chip rather than the modulated signals. In one embodiment, a desired skew can be introduced to compensate for distances of signal travel between components on chip. In one exemplary implementation, the desired skew is introduced to compensate characteristics and configurations of components on chip so that signals leaving electrodes and arrive at the optical modulator waveguide at a desired time (e.g., purposely staggered, synchronously, etc.).

It is appreciated that on chip optical device driver method operations can be implemented by various components. In one embodiment, a memory or computer readable storage medium stores instructions for directing on chip optical device driver method operations and a processing component to execute the instructions. In one embodiment, a custom digital state machine implements the control of on chip optical device driver method operations.

In one embodiment, the relationship of two different signals in a lane is maintained through skew adjustments. If a positive signal in lane and a negative signal in the same lane are intended to have a particular delay or phase difference (e.g., 180 degrees, etc.), the phase difference is maintained even if one of the signals is subjected to a skew adjustment. In one exemplary implementation, a positive signal in a lane is intended to have a 180 degree phase difference to a negative signal in the same lane, if the negative signal is adjusted for skew, then a corresponding adjustment is made in the positive signal of the same lane to maintain the 180 degree phase difference.

In one embodiment, the common mode of the skew detector is controlled. In one exemplary implementation, the voltage level shift in response to the current injection drives a shift in the common mode level of the skew detector output. The common mode level can be optimized for a comparator that follows. The skew detector output signal average value can correspond to the duty cycle of the clock in the skew detector.

In one embodiment, the skew detection and corresponding adjustment can be iteratively/progressively propagated across multiple lanes. In one exemplary implementation, skew detection is performed on a negative signal of Lane A and a positive signal of Lane B and the positive signal of Lane B is adjusted to compensate for the skew. A negative signal of Lane B is also adjusted to match the adjustments in the positive signal of Lane B. Skew detection is performed on a negative signal of Lane B and a positive signal of Lane C and the positive signal of Lane C is adjusted to compensate for the skew. A negative signal of Lane C is also adjusted to match the adjustments in the positive signal of Lane C. Skew detection is performed on a negative signal of Lane C and a positive signal of Lane D and the positive signal of Lane D is adjusted to compensate for the skew. A negative signal of Lane D is also adjusted to match the adjustments in the positive signal of Lane D. The skew detection and adjustments for Lanes A, B, C, and D can occur in various manners (e.g., relatively concurrently, sequentially, etc.). In one exemplary implementation, the skew detection and adjustments can continue until all the positive and negative signals from lanes A, B, C, and D are synchronized. The skew detection and adjustments can be considered to operate in a daisy chained fashion. In one embodiment, the daisy chain skew detection and adjustment operations are flexible and not limited to adjacent lanes. In one exemplary implementation, skew detection is performed on a negative signal of Lane A and a positive signal of Lane C rather than the negative signal of Lane B. In one embodiment, the detections and adjustments progress in a looping type fashion through the various lanes, detecting the skew and making adjustments until desired skew characteristics are achieved.

Figure 9:
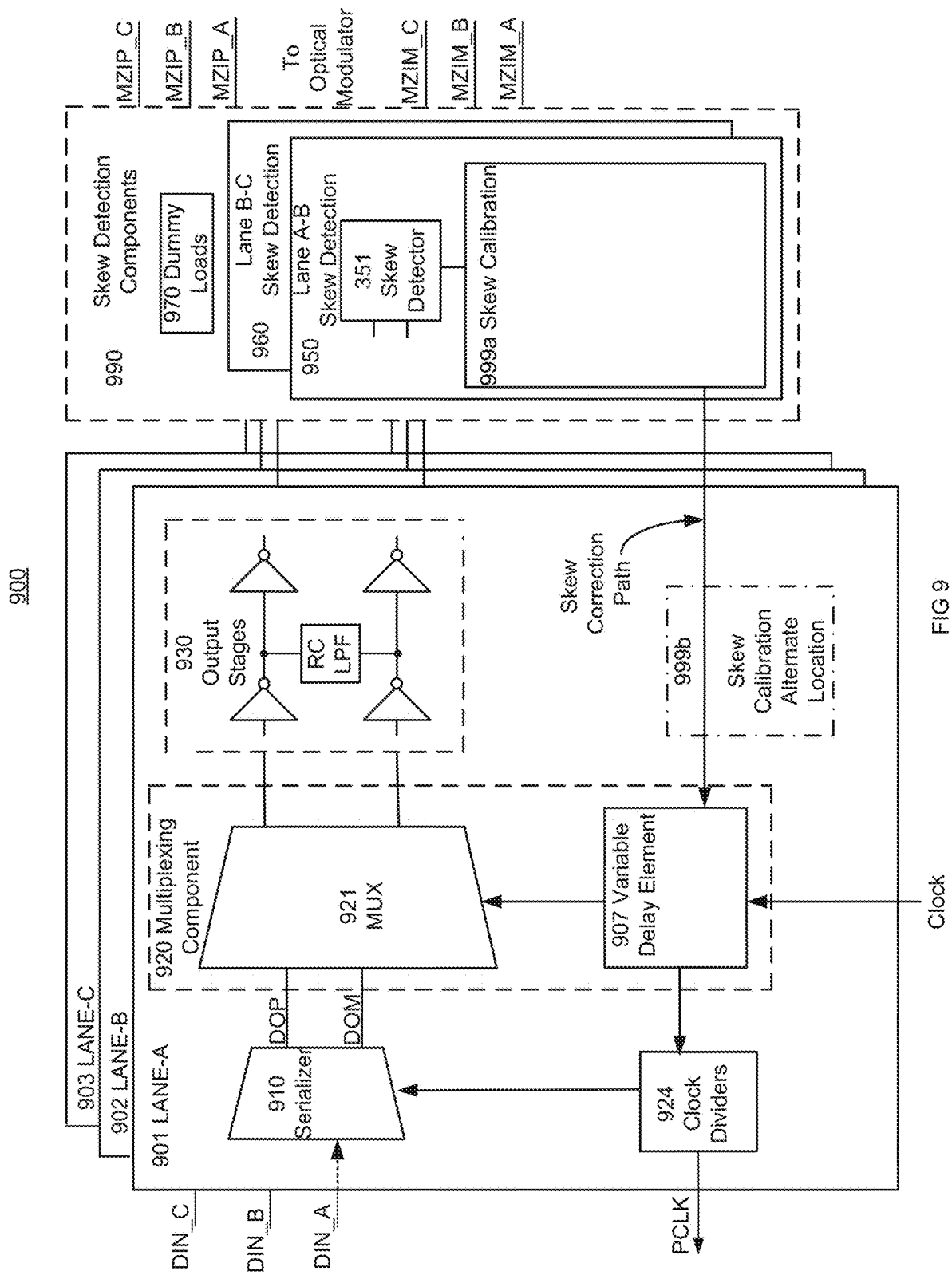
FIG. 9 is a block diagram of another exemplary on chip optical device driver system in accordance with one embodiment.

FIG. 9 is a block diagram an exemplary on chip optical device driver system 900 in accordance with one embodiment. On chip optical device driver system 900 is similar to chip optical device driver system 300. Driver system 900 includes skew detection components 990 and lanes 901, 902, and 903. Lane-A 901 includes on chip components such as serializer 910, multiplexing component 920, clock dividers 924, and an output stage 930. Serializer 910 is communicatively coupled to multiplexing component 920 which is communicatively coupled to output stage 930. In one embodiment, lane-B 902 and lane-C 903 have similar configurations to lane-A 901.

The components of on chip optical device driver system 900 cooperatively operate to provide modulated driver signals to drive an electro-optical modulator configuration to modulate optical signals. In one embodiment, multiplexing component 920 comprises multiplexer (MUX) 921 communicatively coupled to variable delay element 907. MUX 921 implements skew adjustments to aspects of a first output signal and a second output signal. Variable delay element 907 is configured to forward a selection signal to the MUX 921. In one exemplary implementation, variable delay element 907 receives directions from skew calibration component 999a with regards to skew related adjustments for the selection signal sent to the MUX 921.

Skew detection components 990 are configured to detect skew and the skew calibration component is configured direct skew adjustment between a first output signal and a second output signal. In one embodiment, skew detection components 990 include lane skew detection components (e.g., 950, 960, etc.) and dummy loads 970. Lane skew detection component 950 detects skew between lanes A and B. Lane skew detection component 960 detects skew between lanes B and C. Dummy loads 970 are coupled to the Pa and Mc signals that are not coupled to a skew detector.

Lane skew detection component 950 includes skew detector 951 and skew calibration component 999*a*. Skew detector 959*a* is configured to detect a skew difference between the first output signal of lane A (e.g., Ma, etc), and the second output signal of lane B (e.g., Pb, etc). Skew calibration component 352 is configured to direct adjustment of skew between the first output signal and the second output signal. A skew calibration path flows from skew detection components 990 to variable delay element 907. Skew calibration component 999*a* can be included in a skew correction path and direct variable delay element 907 to make skew related adjustments to MUX 921 selection controls. It is appreciated that skew calibration component 999 can be configured at various locations along the skew correction path. In one embodiment, the skew calibration component is located in skew detection component 950 as 999*a* (e.g., similar to skew calibration component 352 in FIG. 3, etc.) and in another embodiment the skew calibration component is in alternate location in lane-A 310 as 999*b* (e.g., similar to skew calibration component 443 in FIG. 4, etc.). In one exemplary implementation, the circuitry of the skew calibration component can be leverage for other operations in addition to skew adjustment (e.g., similar to leverage for QED operations in FIG. 4, etc.). Lane skew detection component 960 can include a skew detector similar to skew detector 951 and a skew calibration component similar to skew calibration component 952.

In one embodiment, calibration and skew adjustment can be performed in both the factory and later after shipment in the field. Unlike traditional calibration and skew detection that is typically limited to being manually performed by specialized technicians in a centralized location (e.g., manufacturing factory, lab, returned to factory, etc.), the on chip skew detection and calibration (e.g., shown in FIG. 1, 3, 4, 5, etc.) can be performed automatically in the field. The calibration can be automatically initiated and performed in response to various triggers or events (e.g., start up, reset, exceeding a temperature threshold, manual trigger, communication link characteristics, performance measurement/issue, voltage glitch, etc.).

It is appreciated that intentional skew characteristics can be introduced at various stages (e.g., in various electronic components, etc.) to achieve a particular skew characteristics in the final modulated optical signal. The intentional skew characteristics can be introduced to compensate for various impacts encountered in implementation of optical light modulation. The impacts can be associated with the characteristics of the electronics involved in the optical light modulation operations. In one embodiment, intentional skew characteristics can be introduced in electronic signals associated with lane A401 (e.g., such as at multiplexing component 420, etc) to compensate for timing issues between lane A-410 and lane-B 402. For example, timing differences in the arrival of input DIN_A signals and DIN_B signals, different electrode/trace lengths in lane A-410 and lane-B 402, and so on. Intentional skew differences in signals within an on chip optical device driver system (e.g., 101, 300, 400, etc.) can be adjusted so that there are skew difference between electronic signals in the driver circuitry (e.g., signals in lane_A, lane_B, etc.) but the modulating light signals arrive in the waveguide (e.g., 105, etc.) with a particular timing relationship (e.g., substantially the same time, particular delay, etc.).

In one embodiment, portions of a skew adjustment component (e.g., 112, 122, 212, 222, 340, 443, 590, etc.) can be used/leveraged to perform various additional/other tasks. In one exemplary implementation, an analog comparator and decision logic component (e.g., 340, 443, etc) can be utilized in the implementation of additional error detection and correction functions/applications (e.g., duty cycle error correction, quadrature error correction, etc.). In one embodiment, additional error detection and correction functions/applications are similar to those described in co-pending USPTO application Ser. No. 16/143,493 entitled "Error Detection and Compensation for a Multiplexing Transmitter". In one exemplary implementation, a skew adjustment component (e.g., 112, 122, 212, 222, 340, 443, 590, etc.) and an analog comparator and decision logic component (e.g., 340, 443, etc) of this detailed description are similar to a quadrature error correction circuit (e.g., 114, 115, 402, etc.) of the co-pending USPTO application Ser. No. 16/143,493 entitled "Error Detection and Compensation for a Multiplexing Transmitter".

In one embodiment, an objective is to have particular signal characteristics at a data output just before transmission to another component. With reference again to FIG. 1 an objective can be to have particular signal characteristic (e.g., skew, duty cycle, etc.) at a data output of a driver 101 just before transmission to a wave guide 105. In one exemplary implementation, detecting or sensing an error (e.g., skew error, quadrature error, duty cycle error, etc.) at a driver output enables an efficient and effective adjustment of signal characteristics. Detecting or sensing an error at another point in a circuit can lead to various complications and diminished objective realization. Directly sensing (e.g., skew, quadrature error, etc.) in an internal clock signal generated/distributed signal may miss errors introduced to the final data output by other aspects of a data path. With reference to FIG. 4 for example, if a skew detector (not shown) was inserted to senses skew in the clock/selection signals between MUX 421 and the first phase/second phase interpolator components 422 and 423, other components in the data path (e.g., output stages 430, etc.) might introduce errors in the data output signals (e.g., MZIPA, MZIMA. etc.) that would not be detected or sensed without skew detector 451. Undetected errors could make the error correction/adjustments inaccurate.

In one embodiment, a skew adjustment component adjusts respective modulated driver signals in accordance with an average of an error characteristic (e.g., average of skew error, duty cycle error, quadrature error, etc.). In one exemplary implementation, a skew adjustment component adjusts respective modulated driver signals based upon an average of skew misalignments between two output signals (e.g., Ma and Pb in FIG. 1, Mb and Pc in FIG. 2, etc.). The average can be based upon detections from respective detection components over time. For example, an average of sensed skew differences between Ma and Pb from skew detector 151 in FIG. 1. The average can be based upon synchronous detections from multiple detection components. For example, an average of synchronously sensed skew differences between Ma and Pb from skew detector 151, Mb and Pc from skew detector 152, and Mc and Pd from skew detector 153. In one embodiment, a skew adjustment component determines a differential average error value based upon a comparison of two sensed/detected skew averages. A skew adjustment component can make an adjustment based upon the differential average error value. In one embodiment, adjustments based on an average of errors are used to normalize the results. Adjustments based on an average of errors can be used to facilitate improved global performance or optimization. In one exemplary implementation, the adjustments result in a sum of the average of errors being set to zero.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. An on chip optical device driver method comprising:
    detecting a skew difference between a first output signal and a second output signal on a chip, wherein the first output signal and the second output signal are modulation signals configured to modulate respective optical signals, wherein the first output signal is one of a plurality of output signals in a first modulation lane and the second output signal is one of a plurality of output signals in a second modulation lane concurrently, wherein the detecting includes sensing the skew difference; and
    adjusting the skew automatically on the chip based upon results of the detecting, wherein the adjusting the skew includes:
    adjusting an in-phase selection signal and forwarding the in-phase selection signal to a multiplexer;
    adjusting a quadrature selection signal and forwarding the quadrature selection signal to the multiplexer; and
    selectively outputting an in-phase component and a quadrature component of serial data signals based upon the forwarded in-phase selection signal and forwarded quadrature selection signal.

2. The chip optical device driver method of claim 1 wherein the first output signal is associated with a first differential signal pair in the first modulation lane and the second output signal is associated with a second differential signal pair in the second modulation lane.

3. The chip optical device driver method of claim 2 wherein the first output signal is a positive signal of the first modulation lane and the second output signal is a negative signal of the second modulation lane.

4. The chip optical device driver method of claim 1 wherein the detecting the skew difference comprises:
    applying a signal pattern from a plurality of transmitters; and
    enabling a skew detector.

5. The chip optical device driver method of claim 1 wherein the adjusting the skew comprises:
    enabling a calibration mode; and
    performing an offset adjustment process on the first output signal with respect to the second output signal.

6. The chip optical device driver method of claim 5 wherein the offset adjustment process comprises:
    applying an offset current adjustment on chip to at least one of the first output signal and the second output signal; and
    comparing the results of the offset current application;
    wherein the applying an offset current adjustment and comparing the results are performed iteratively until a resulting particular skew value is achieved.

7. The chip optical device driver method of claim 5 wherein the offset adjustment process includes an auto zero calibration process in which the resulting particular skew value is zero and indicates there is no skew between first output signal and the second output signal.

8. The chip optical device driver method of claim 5 wherein the offset adjustment process includes adjusting, on chip, a delay between the first output signal and the second output signal.

9. The chip optical device driver method of claim 1 further comprising tuning to compensate mismatches in a loop.

10. The chip optical device driver method of claim 1 wherein the skew is adjusted so the skew difference is fixed between the first output signal and the second output signal.

11. The chip optical device driver method of claim 1 further comprising selectively switching between a calibration mode and normal mode.

12. The chip optical device driver method of claim 1 further comprising detecting skew at a data output of a driver just before transmission to a wave guide.

13. The chip optical device driver method of claim 1 wherein the detecting uses the first output signal and the second output signal.

14. An on chip optical device driver system comprising:
an on chip output stage circuit configured to output signals, including a first output signal included in a first lane and a second output signal included in the first lane concurrently;
an on chip skew detector configured to sense and detect a skew difference between the first output signal included in the first lane and a second output signal included in a second lane;
an on chip skew calibration component with circuitry configured to direct skew adjustment between the first output signal included in the first lane and the second output signal included in the second lane; and
a multiplexing component comprising:
a multiplexer configured to selectively output an in-phase component and a quadrature component of serial data signals;
a first phase interpolator component circuitry configured to forward an in-phase selection signal to the multiplexer; and
a second phase interpolator component circuitry configured to forward quadrature selection signal to the multiplexer.

15. The driver system of claim 14 further comprising
a first switch configured to selectively couple the on chip skew calibration component to the skew detector and the output stage; and
a second switch configured to selectively couple the on chip skew calibration component to an in-phase interpolator aspect and a quadrature interpolator aspect of the skew adjustment component.

16. The driver system of claim 14 wherein the skew calibration component comprises an analog comparator and a digital to analog converter.

17. The driver system of claim 14 wherein the skew is adjusted so there is zero skew difference between the first output signal of the first lane and the second output signal of the second lane.

18. The driver system of claim 14 wherein the skew is adjusted so there is fixed skew difference between the first output signal of the first lane and the second output signal of the second lane.

19. The driver system of claim 14 wherein the first lane and second lane are modulation lanes.

20. The driver system of claim 14 wherein:
the on chip skew detector comprises:
a mode select component; and
a Phase Frequency Detector (PFD) component coupled to the mode select component; and
the on chip skew calibration component comprises an analog comparator and decision logic, including:
variable current sources that supply an adjusted offset currents;
an analog comparator coupled to the variable current sources; and
a digital filter coupled to the analog comparator.

21. The driver system of claim 14 wherein:
the on chip skew detector comprises:
a mode select component; and
a Phase Frequency Detector (PFD) component coupled to the mode select component; and
the on chip skew calibration component comprises an analog comparator and decision logic, including:
a digital to analog (DAC) converter that supplies offset currents;
an analog comparator coupled to the M-bit digital to analog (DAC) converter; and
a digital filter coupled to the analog comparator.

22. The driver system of claim 14 wherein the multiplexing component includes a variable delay element.

23. The driver system of claim 14 wherein a predetermined amount of skew is included in the in-phase component and the quadrature component of the serial data signals.

24. The chip optical device driver method of claim 1 further comprising determining a set amount of skew and including the set amount of skew in the in-phase component and the quadrature component of the serial data signals.

25. The chip optical device driver method of claim 1 wherein detecting a skew difference and adjusting the skew automatically are performed in response to a trigger.

26. The chip optical device driver method of claim 25 wherein the trigger is from an internal on chip source.

27. The chip optical device driver method of claim 25 wherein the trigger is from an external off chip source.

28. The chip optical device driver method of claim 25 wherein the trigger is based upon a condition.

29. The chip optical device driver method of claim 28 wherein the condition corresponds to a condition in a manufacturing facility.

30. The chip optical device driver method of claim 28 wherein the condition corresponds to a condition in the field.

31. The chip optical device driver method of claim 28 wherein the condition corresponds to a manufacturing facility condition and is similar to a field condition.

32. The chip optical device driver method of claim 1, wherein the detecting a skew difference includes:
performing a setup process, including applying a predefined clock pattern, enabling a skew detector, and putting a system in calibration mode;
enabling a detector offset calibration path;
starting offset calibration;
performing an analysis of a skew adjustment introduced in a Digital to Analog Converter (DAC) code, wherein the DAC code is used to create an offset in a DAC, and the offset has the effect of implementing a fixed skew adjustment between lanes;
determining if the offset calibration and the analysis of the skew adjustment introduced in the DAC code are settled;
disabling the skew detector calibration mode; and
wherein the adjusting the skew automatically includes:
enabling a skew correction path;
performing an analysis of a skew adjustment introduced in an In-Phase Interpolator (I-PI) code;
determining if the I-PI code is settled; and
enabling skew corrections.

33. The chip optical device driver method of claim 32 wherein the skew corrections include Quadrature Error Correction (QEC) corrections that make adjustments to align a quadrature (Q) related signal and an in-phase (I) related signal.

34. The chip optical device driver method of claim 32 further comprising:
performing a first iterative wait time in between iterative implementations of the determining if the offset calibration and analysis of the skew adjustment introduced in the DAC code are settled; and
performing a second iterative wait time in between iterative implementations of the determining if the I-PI code is settled.

35. The chip optical device driver method of claim 32 further comprising introducing a preliminary skew adjustment that is performed after the analysis and results of including the skew adjustment introduced in the DAC code are settled and the offset calibration is completed.

36. The chip optical device driver method of claim 32 further comprising introducing a preliminary skew adjustment that is performed after the I-PI code is settled.

* * * * *